United States Patent [19]
Poggemiller et al.

[11] 4,209,067
[45] Jun. 24, 1980

[54] DRAFT CONTROL AND TAIL BEAM DEVICE FOR GROUND WORKING DISCER TYPE AGRICULTURAL IMPLEMENTS AND THE LIKE

[75] Inventors: Erhard Poggemiller, Luseland; Ralph W. Sweet, Forgan, both of Canada

[73] Assignees: Kep Enterprises, Luseland; Sweet Manufacturing Ltd., Forgan, both of Canada

[21] Appl. No.: 835,048

[22] Filed: Sep. 21, 1977

[30] Foreign Application Priority Data

Sep. 23, 1976 [GB] United Kingdom ............... 39532/76

[51] Int. Cl.² .................. A01B 25/00; A01B 61/04
[52] U.S. Cl. .................................. 172/190; 172/261; 172/291; 172/567; 172/578
[58] Field of Search ............... 172/291, 290, 287, 286, 172/190, 261, 264, 265, 567, 578, 599

[56] References Cited
U.S. PATENT DOCUMENTS

| | | | |
|---|---|---|---|
| 2,754,743 | 7/1956 | Ryden | 172/190 X |
| 3,219,126 | 11/1965 | Lymburner | 172/286 |
| 3,477,516 | 11/1969 | Sweet | 172/190 X |
| 3,481,407 | 12/1969 | Arnold | 172/265 X |
| 3,601,202 | 8/1971 | Steffe | 172/190 |
| 3,752,092 | 8/1973 | Vinyard | 172/261 |

OTHER PUBLICATIONS

"Disktillers and Rod Weeders", Publication of John Deere, 1972, pp. 16–19.

*Primary Examiner*—Richard J. Johnson
*Attorney, Agent, or Firm*—Stanley G. Ade

[57] ABSTRACT

A cultivating implement such as a discer is provided with a coulter disc engageable with the ground and secured to the tail beam with the depth being preset by the hydraulic setting of the main disc gang. A fluid operator is included at a preset pressure and normally is fully extended until an obstruction is reached at which time the preset pressure is exceeded and the fluid operator or ram unloads and allows the coulter to raise up and clear the obstruction. Once cleared, the pressure in the ram returns the coulter to the preset depth. This coulter assists in maintaining the angle of travel of the discer, particularly on side hills, together with the pivoted rudder wheel assembly. In this invention the rudder wheel assembly is normally held against a stop at the desired angle, by a further ram or fluid operator instead of a spring and which only unloads during turning to allow rudder wheel assembly to break away. The use of a ram overcomes the usual difficulties associated with springs in which little or no resistance is encountered at the beginning of the extension of the spring.

44 Claims, 3 Drawing Figures

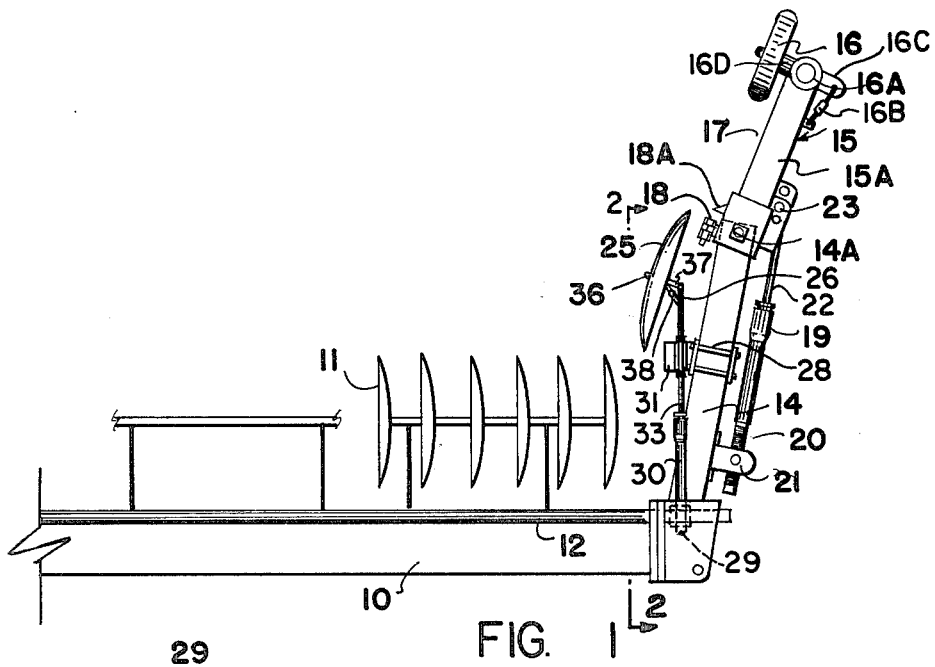
FIG. 1
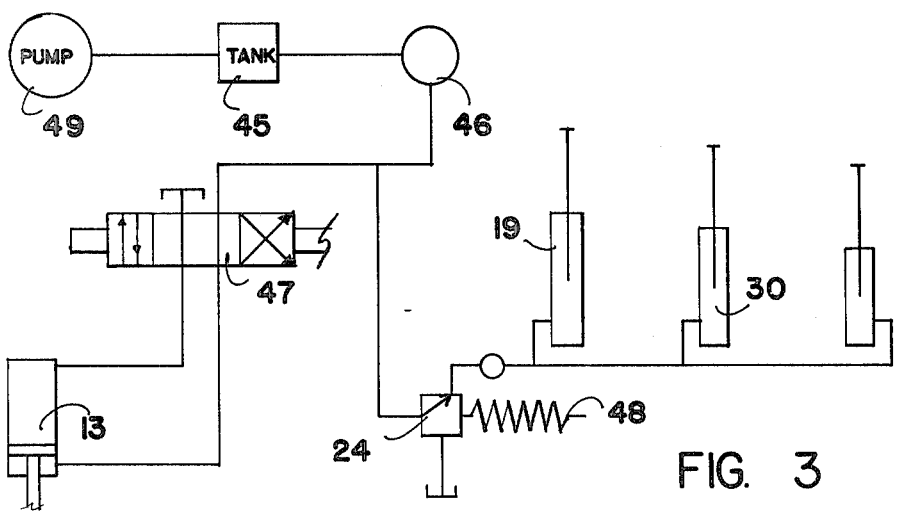
FIG. 2
FIG. 3

DRAFT CONTROL AND TAIL BEAM DEVICE FOR GROUND WORKING DISCER TYPE AGRICULTURAL IMPLEMENTS AND THE LIKE

BACKGROUND OF THE INVENTION

This invention relates to new and useful improvements in draft control and tail beam devices for ground working discer type agricultural implements.

Conventionally, the tail beam and associated rudder wheel maintains the draft angle of the discer as it is pulled by the tractor at an angle to the direction of travel and this angle is maintained by means of a heavy-duty spring extending between the rudder wheel assembly and the tail beam. However, springs have an unfortunate characteristic namely that the resistance increases as the spring is expanded so that there is a relative lack of resistance at the first portion of travel of a heavy-duty tension spring.

While this does not effect the breaking away of the rudder wheel assembly during turning operations, nevertheless it is unsatisfactory when used in the operating position particularly when varying conditions of ground are encountered.

For example, if the disc gangs are set at a predetermined depth in relatively soft ground and the machine is tracking satisfactory being maintained by means of the rudder wheel engaging the side of the furrow, then if a patch of hard ground is encountered, the disc gangs tend to elevate relative to the ground surface thus relieving the pressure and permitting the machine to "run out." The spring between the rudder wheel assembly and the tail beam does not have sufficient strength in its initial expansion to maintain the rudder wheel assembly in the correct relationship so that the entire setting of the machine is disturbed.

The reverse is also true. Namely, if tilling relatively firm ground, and a soft patch is reached, the discs dig deeper and the draft is upset because the rudder wheel assembly cannot maintain the correct angular relationship.

Another disadvantage occurs particularly when the device is being used on side hills or uneven terrain under which circumstances the rudder wheel assembly with a spring connection is not sufficient to maintain the sideward movement of the discer.

SUMMARY OF THE INVENTION

These disadvantages are overcome by the present device which firstly incorporates a pivoted rudder wheel assembly normally maintained in the correct relationship by means of a hydraulic piston and cylinder assembly extending between the rudder wheel assembly and the tail beam. This provides equal resistance to breaking under all circumstances until a predetermined load is reached at which time the piston and cylinder will be retracted thus allowing the rudder wheel assembly to break as for example when the implement is turned.

The pressure at which the break occurs is controlled by an adjustable hydraulic valve so that under normal circumstances and if no turning occurs, the rudder wheel assembly will be maintained in its correct relationship regardless of the ground conditions.

In order to assist the implement in maintaining its correct side draft or movement, a side hill coulter is provided pivotally secured to the tail beam and engaging the hard ground in the furrow which is left by the discs, just ahead and inboard of the rudder wheel assembly.

The depth of penetration of this side hill coulter is controlled by the main discer cylinder which controls the depth of penetration of the gangs and once again an hydraulic piston and cylinder assembly is incorporated in this side hill coulter which normally maintains it at the preset depth regardless of the ground condition yet at the same time permits it to be elevated and reset if an obstruction is encountered under which circumstances, the piston and cylinder assembly overrides the preset valve pressure and allows the piston and cylinder assembly to retract. However, once the obstruction is passed, then the piston and cylinder assembly return to the extended position and cause the side hill coulter to once again penetrate the ground to the required depth.

One aspect of the invention consists an improvement to an agricultural implement which includes a main frame, ground engaging tools on said main frame and means to adjust the depth and penetration of said ground engaging tools, a tail beam extending at an angle from one end of the main frame and a rudder beam assembly pivoted to the tail beam and including a ground engaging wheel assembly pivotally mounted on said rudder beam assembly, said implement normally being pulled by a tractor or the like at an angle to the direction of travel with the ground engaging wheel in trailing relationship to the implement and assisting in maintaining the said angle of travel, and a source of hydraulic fluid under pressure; the improvement comprising in combination a fluid operator operatively extending between said tail beam and said rudder beam assembly and being operatively connected to said source of fluid pressure, means to preset fluid pressure in said fluid operator, a pressure relief valve operatively connected between said source of fluid pressure and said fluid operator and stop means between said tail beam and said rudder beam assembly, said fluid operator normally maintaining said rudder beam assembly against said stop means.

Another aspect of the invention may consist of an improvement to an agricultural implement which includes a main frame, ground engaging tools on said main frame and means to adjust the depth and penetration of said ground engaging tools, a tail beam extending at an angle from one end of the main frame and a rudder beam assembly pivoted to the tail beam and including a ground engaging wheel assembly pivotally mounted on said rudder beam assembly, said implement normally being pulled by a tractor or the like at an angle to the direction of travel with the ground engaging wheel in trailing relationship to the implement and assisting in maintaining the said angle of travel, and a source of hydraulic fluid under pressure; the improvement comprising in combination a coulter assembly mounted to said tail beam assembly, said coulter assembly including a ground engaging coulter disc, means mounting said coulter disc for substantially vertical adjustment relative to said tail beam whereby the depth of ground penetration of said disc may be controlled within limits, and means for adjusting the depth of penetration of said coulter disc and maintaining same.

With the foregoing in view, and other advantages as will become apparent to those skilled in the art to which this invention relates as this specification proceeds, our invention consists essentially in the arrangement and construction of parts all as hereinafter more particularly described, reference being had to the accompanying drawings in which:

DESCRIPTION OF THE DRAWINGS

FIG. 1 is a schematic top plan view of the rudder assembly end of a discer type agricultural implement.

FIG. 2 is a partial side elevation of FIG. 1 substantially along the line 2—2 thereof, but with the rudder wheel assembly removed for clarity.

FIG. 3 is a schematic diagram of the hydraulic circuitry involved.

In the drawings like characters of reference indicate corresponding parts in the different figures.

DETAILED DESCRIPTION

Proceeding therefore to describe the invention in detail, reference character 10 shows the main frame of the agricultural implement which is provided with sets or gangs of discs 11 in the usual way, said gangs being mounted upon a rock shaft 12 and being raised and lowered by a main cylinder assembly shown in FIG. 3 by reference character 13.

A supporting tail beam unit 14 is welded or otherwise secured by one end thereof to one end of the main frame 10 and extends rearwardly and at a slight angle therefrom as clearly shown in FIG. 1. A rudder wheel assembly 15 including a rudder wheel beam 15A is pivotally secured to the distal end of the tail beam 14 by pivot pin 14A and carries a rudder wheel 16 pivotally mounted as at 16A on the end of the rudder wheel beam 17 in the usual way, with adjustable stop assembly 18 enabling the angular relationship of the rudder wheel assembly to be set within limits relative to the main frame as will hereinafter be described. A further adjustment is provided by means of a turnbuckle assembly 16B extending between an extension 16C of the rudder wheel mount 16D and the rudder beam 15A.

Instead of the usual heavy-duty tension spring which normally extends between the rudder wheel assembly and the tail beam 14, we have provided a fluid operator 19 consisting of a piston and cylinder assembly clearly shown in FIG. 1.

This fluid operator, in this embodiment, includes a cylinder 20 secured to the tail beam by means of pivot clevis 21, and a piston rod 22 extending from the cylinder and being connected in any one of a plurality of apertures 23 within the rudder wheel beam 15A.

In other words, the draft angle is set by means of the adjustable stop 18 and then the piston rod 22 is fully extended within the rudder wheel beam 15A.

Hydraulic pressure is used to operate ram 19 which maintains the direction of travel of the discer and width of the cut. The ram extends and is fastened and pivoted at points 21 and 23 and it exerts a force to rudder beam 15A which pivots about point 14A. This force causes the rudder wheel assembly 15 to move against the adjustable stop 18 when stop bar 18A is held up firmly against 18. The rear wheel 16 will then make the discer track properly. Rear wheel 16 can further be adjusted by adjusting turnbuckle 16B thus pivoting the rear wheel 16 about point 16A as hereinbefore described. This stop 18 will rest against stop bar 18A at all times unless the implement turns a corner in which case the force on rudder assembly 15 exceeds the preset pressure in fluid operator 19 under which circumstances the fluid operator compresses until the corner is turned.

The fluid operator 19 is connected in circuit with a pressure regulating valve 24 shown in FIG. 3 so that a predetermined fluid pressure is provided in the fluid operator 19. This maintains the angular relationship of the rudder beam assembly which will not break away from stop 18 unless the force exceeds the predetermined fluid pressure set upon the regulating valve 24.

The coulter assembly is shown in FIGS. 1 and 2 and includes a disc 25 journalled for rotation upon one end of a link, shaft or arm 26 which in turn forms part of an adjustable crank arm assembly 26A pivoted as at 27, to a bracket assembly 28 secured to the tail beam 14.

A lever 29 is secured to the aforementioned rock shaft 12 and extends upwardly therefrom and a fluid operator 30 is secured by one end thereof to the lever 29 and by the other end thereof to the upper end 31 of the portion 32 of the crank pivoted at 27 and carrying the coulter wheel 25.

The piston rod 33 of the fluid operator is adjustably connected to the upper end 31 by means of nuts 34 and a plurality of positions is provided within the arm 29 for pivotal attachment of the cylinder portion 35 of the fluid operator 30.

The upper end 31 may take the form of a clevis or or apertured block and the portion 32 comprises a sleeve 32A secured as by welding to the upper end 31. This sleeve engages over the upper end of shaft 32 and is provided to permit the aforementioned adjustable connection of the fluid operator. When the adjustment has been set, thus controlling the maximum depth of penetration of the coulter wheel 25, a set screw 32B locks the sleeve to the shaft 32.

Once again this fluid operator is connected in circuit to the pressure regulating valve 24 as shown in FIG. 3 and normally this fluid operator is fully extended at all times by the pressure from the hydraulic circuit as will hereinafter be described.

The depth of the coulter disc 25 is controlled by the depth of the gangs 11 connected also to the rock shaft 12 in the usual manner, and which in turn are set by the main fluid operator 13 and this depth is maintained by the fluid operator 30 unless an obstruction is encountered at which time the excess pressure created overrides the pressure regulating valve 24 and allows the fluid operator 30 to retract until the obstruction is passed whereupon the fluid pressure within the system returns the coulter to the preset depth.

In other words, as rock shaft 12 is rotated, it moves actuating arm 29 through an arc and transfers this movement along the coulter reset ram or fluid operator 30 to the crank arm assembly 26A and thence to the coulter disc 25.

The coulter assembly can be adjusted both vertically (by adjusting the position of the fluid operator 30 as hereinbefore described) and horizontally. Insofar as the adjustment in the horizontal plane is concerned, the coulter disc 25 is journalled for rotation upon a short stub shaft 36 which is pivoted to the distal end of the link 26 of the crank arm assembly 26A by means of an adjustable pivot 37 which is adjusted by turnbuckle 38. This turnbuckle 38 is used to adjust coulter 25 to follow a track parallel to and in the furrow so as not to gouge same or to allow the machine to lose its' line of draft.

The shaft or link 26 is slidably mounted in a sleeve 26A which in turn is attached, as by welding, to the lower end of the other arm or shaft 32. The shaft 26 is movable longitudinally through this sleeve to preset the location of the coulter lengthwise of the member 14. Set screw 26B is tightened to assist in holding the coulter in position. Diagonal member 38 is provided with an outrigger sleeve or support 39 surrounding the shaft 26 to which it is detachably clamped by set screw 40 after the shaft is positioned. The upper end of member 38 is pivotally connected between a pair of plates 41 secured, as by welding, and extending from the other or vertical arm or shaft 32 and a steady bar 38 is secured, also as by welding, to and extends upwardly from shaft 26 between these plates and is locked in position by a bolt 43 extending through plates 41 and steady bar 38, the plates being drilled when the coulter is correctly positioned. This steady bar maintains the verticallity of the coulter blade by preventing movement of the coulter blade and shaft 26, around the longitudinal axis of said shaft.

The coulter assembly 25 assists in holding the discer on steep slopes and also maintains its stability under the majority of circumstances thus maintaining the sideward movement of the discer in hilly conditions and maintaining control of any side draft or movement of the discer or other agricultural implement.

The hydraulic circuit shown in FIG. 3 includes a pump 49, tank 45, filter 46 and four-way control solenoid valve assembly 47.

The pressure regulating valve 24 is of course provided with a pressure relief valve 48 which is adjustable so that the fluid operators 19 or 30 may retract if a predetermined pressure is exceeded as hereinbefore described, either for turning of the implement insofar as the fluid operator 19 is concerned, or encountering an obstruction insofar as the coulter fluid operator 30 is concerned.

If, of course, additional pressure is required in either the fluid operator 19 or 30, it is merely necessary to increase the effective diameter of the fluid operator thus utilizing a constant preset fluid pressure for the tripping thereof.

It will be appreciated that as the corner is turned, in order to enable the coulter wheel 25 to be raised, in order to avoid dragging dirt, pivot point 14A could be set on a slight bias or angle from the vertical so as to raise the tail beam 14 sufficiently to raise the coulter 25 in order to avoid this dragging of dirt. This would only happen as rudder assembly 15 breaks away from the stop 18 and compresses ram or fluid operator 19. Then, as the pressure on the rudder assembly is reduced as the turn is completed, the assembly is forced against stop 18 by the pressure of ram 19 thus returning and maintaining the discer at a constant width cut.

Although the description and drawings refer to a one-way discer, nevertheless it will be appreciated that the invention can be adapted for use with any ground engaging implement which is pulled at a draft angle and maintained by a rudder assembly extending rearwardly from one end of the main frame.

The present device will stabilize the draft on an implement and maintain the width of cut thereof. It will hold the implement stable under difficult conditions such as hillsides and hard and soft soil.

It allows an operator to till the soil with any depth and yet still maintain a stable width of cut and overcomes many missed areas often present on hillsides cultivated with conventional machines.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention is:

1. In an agricultural implement which includes a main frame, ground engaging tools on said main frame, means to raise and lower and adjust the depth and penetration of said ground engaging tools, a tail beam extending at an angle from one end of the main frame and a rudder beam assembly pivoted to the tail beam and including a ground engaging wheel assembly pivotally mounted on said rudder beam assembly, said implement normally being pulled by a tractor or the like at an angle to the direction of travel with the ground engaging wheel in trailing relationship to the implement and assisting in maintaining the said angle of travel, and a source of hydraulic fluid under pressure; the improvement comprising in combination a coulter assembly mounted on the inside of said tail beam, said coulter assembly including coulter means, means mounting said coulter assembly to said tail beam for pivotal action whereby said coulter means moves in a substantially vertical plane, and means operatively connecting said coulter assembly with said means to raise and lower said ground engaging tools whereby said coulter means is raised and lowered simultaneously with said ground engaging tools, said coulter assembly including a crank arm assembly pivotally mounted for movement in a substantially vertical plane, to said tail beam, said crank arm assembly including a coulter means supporting arm forming one arm of said crank arm assembly and a substantially vertically situated control arm forming the other arm of said crank arm assembly, means to mount said coulter means support arm for fore and aft adjustment relative to said vertically situated control arm and means to maintain said coulter means substantially vertically when operating.

2. The invention according to claim 1 which includes means to adjust said coulter assembly independently of said ground engaging tools to set the maximum depth of penetration of said coulter means of said coulter assembly.

3. The invention according to claim 2 in which said coulter assembly includes a crank arm assembly pivotally mounted for movement in a substantially vertical plane, to said tail beam, said crank arm assembly including a coulter means supporting arm forming one arm of said crank arm assembly and a substantially vertically situated control arm forming the other arm of said crank arm assembly, means to mount said coulter means support arm for fore and aft adjustment relative to said vertically situated control arm and means to maintain said coulter means substantially vertically when operating.

4. The invention according to claim 3 in which said means to mount said coulter means support arm includes a guide secured to the lower end of said substantially vertically situated control arm, said coulter means support arm being mounted for sliding movement through said guide and means to clamp said guide to said arm in the desired position, and an outrigger support guide extending from said vertically situated control arm to said coulter means support arm and means to clamp said outrigger support guide to said last mentioned arm, in the desired position.

5. The invention according to claim 4 which includes a fluid operator operatively extending between said tail beam and said rudder beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

6. The invention according to claim 5 in which said rudder beam assembly includes a turnbuckle assembly between said ground engaging wheel assembly and said rudder beam assembly for adjusting angle of said wheel assembly relative to said rudder beam assembly, in a horizontal plane and within limits.

7. The invention according to claim 3 in which said means to adjust said coulter assembly independently of said ground engaging tools includes a fluid operator acting as a rigid link up to a predetermined pressure, operatively connected by one end thereof to said means to raise and lower said ground engaging tools, and by the other end thereof to the upper end of said vertically situated control arm, and means to adjust the effective length of said fluid operator and hence the maximum depth of penetration of said coulter means.

8. The invention according to claim 7 which includes a fluid operator operatively extending between said tail beam and said rudder beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

9. The invention according to claim 8 in which said rudder beam assembly includes a turnbuckle assembly between said ground engaging wheel assembly and said rudder beam assembly for adjusting angle of said wheel assembly relative to said rudder beam assembly, in a horizontal plane and within limits.

10. The invention according to claim 3 which includes a fluid operator operatively extending between said tail beam and said rudder beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

11. The invention according to claim 10 in which said rudder beam assembly includes a turnbuckle assembly between said ground engaging wheel assembly and said rudder beam assembly for adjusting angle of said wheel assembly relative to said rudder beam assembly, in a horizontal plane and within limits.

12. The invention according to claim 2 in which said means to adjust said coulter assembly independently of said ground engaging tools includes a fluid operator acting as a rigid link up to a predetermined pressure, operatively connected by one end thereof to said means to raise and lower said ground engaging tools, and by the other end thereof to the upper end of said vertically situated control arm, and means to adjust the effective length of said fluid operator and hence the maximum depth of penetration of said coulter means.

13. The invention according to claim 12 which includes a fluid operator operatively extending between said tail beam and said rudder beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

14. The invention according to claim 13 in which said rudder beam assembly includes a turnbuckle assembly between said ground engaging wheel assembly and said rudder beam assembly for adjusting angle of said wheel assembly relative to said rudder beam assembly, in a horizontal plane and within limits.

15. The invention according to claim 2 which includes a fluid operator operatively extending between said tail beam and said rudder beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

16. The invention according to claim 15 in which said rudder beam assembly includes a turnbuckle assembly between said ground engaging wheel assembly and said rudder beam assembly for adjusting angle of said wheel assembly relative to said rudder beam assembly, in a horizontal plane and within limits.

17. The invention according to claim 1 which includes a fluid operator operatively extending between said tail beam and said rudder beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

18. The invention according to claim 17 in which said rudder beam assembly includes a turnbuckle assembly between said ground engaging wheel assembly and said rudder beam assembly for adjusting angle of said wheel assembly relative to said rudder beam assembly, in a horizontal plane and within limits.

19. An agricultural implement comprising in combination a main frame, ground engaging wheels on said main frame and means to raise and lower and adjust the depth and penetration of said ground engaging tools, a tail beam extending at an angle from one end of the main frame and a rudder beam assembly pivoted to the tail beam and including a ground engaging wheel assembly pivotally mounted on said rudder beam assembly, said implement normally being pulled by a tractor or the like at an angle to the direction of travel with the ground engaging wheel in trailing relationship to the implement and assisting in maintaining the said angle of travel, a source of hydraulic fluid under pressure, a coulter assembly mounted on the inside of said tail beam, said coulter assembly including a coulter means, means mounting said coulter assembly to said tail beam for pivotal action whereby said coulter means moves in a substantially vertical plane and means operatively connecting said coulter assembly with said means to raise and lower said ground engaging tools whereby said coulter means is raised and lowered simultaneously with said ground engaging tools, said coulter assembly including a crank arm assembly pivotally mounted for movement in a substantially vertical plane, to said tail beam, said crank arm assembly including a coulter means supporting arm forming one arm of said crank arm assembly and a substantially vertically situated control arm forming the other arm of said crank arm assembly, means to mount said coulter means support arm for fore and aft adjustment relative to said vertically situated control arm and means to maintain said coulter means substantially vertically when operating.

20. The invention according to claim 19 which includes means to adjust said coulter assembly independently of said ground engaging tools to set the maximum depth of penetration of said coulter means of said coulter assembly.

21. The invention according to claim 20 in which said coulter assembly includes a crank arm assembly pivotally mounted for movement in a substantially vertical plane, to said tail beam, said crank arm assembly including a coulter means supporting arm forming one arm of said crank arm assembly and a substantially vertically situated control arm forming the other arm of said crank arm assembly, means to mount said coulter means support arm for fore and aft adjustment relative to said vertically situated control arm and means to maintain said coulter means substantially vertically when operating.

22. The invention according to claim 21 in which said means to mount said coulter means support arm includes a guide secured to the lower end of said substantially vertically situated control arm, said coulter means support arm being mounted for sliding movement through said guide and means to clamp said guide to said arm in the desired position, and an outrigger support guide extending from said vertically situated control arm to said coulter means support arm and means to clamp said outrigger support guide to said last mentioned arm, in the desired position.

23. The invention according to claim 22 which includes a fluid operator operatively extending between said tail beam and said rubber beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

24. The invention according to claim 23 in which said rudder beam assembly includes a turnbuckle assembly between said ground engaging wheel assembly and said rudder beam assembly for adjusting angle of said wheel assembly relative to said rudder beam assembly, in a horizontal plane and within limits.

25. The invention according to claim 21 in which said means to adjust said coulter assembly independently of said ground engaging tools includes a fluid operator acting as a rigid link up to a predetermined pressure, operatively connected by one end thereof to said means to raise and lower said ground engaging tools, and by the other end thereof to the upper end of said vertically situated control arm, and means to adjust the effective length of said fluid operator and hence the maximum depth of penetration of said coulter means.

26. The invention according to claim 25 which includes a fluid operator operatively extending between said tail beam and said rudder beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

27. The invention according to claim 26 in which said rudder beam assembly includes a turnbuckle assembly between said ground engaging wheel assembly and said rudder beam assembly for adjusting angle of said wheel assembly relative to said rudder beam assembly, in a horizontal plane and within limits.

28. The invention according to claim 20 which includes a fluid operator operatively extending between said tail beam and said rudder beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

29. The invention according to claim 28 in which said rudder beam assembly includes a turnbuckle assembly between said ground engaging wheel assembly and said rudder beam assembly for adjusting angle of said wheel assembly relative to said rudder beam assembly, in a horizontal plane and within limits.

30. The invention according to claim 21 which includes a fluid operator operatively extending between said tail beam and said rudder beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

31. The invention according to claim 30 in which said rudder beam assembly includes a turnbuckle assembly between said ground engaging wheel assembly and said rudder beam assembly for adjusting angle of said wheel assembly relative to said rudder beam assembly, in a horizontal plane and within limits.

32. The invention according to claim 20 in which said means to adjust said coulter assembly independently of said ground engaging tools includes a fluid operator acting as a rigid link up to a predetermined pressure, operatively connected by one end thereof to said means to raise and lower said ground engaging tools, and by the other end thereof to the upper end of said vertically situated control arm, and means to adjust the effective length of said fluid operator and hence the maximum depth of penetration of said coulter means.

33. The invention according to claim 32 which includes a fluid operator operatively extending between said tail beam and said rudder beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

34. The invention according to claim 33 in which said rudder beam assembly includes a turnbuckle assembly between said ground engaging wheel assembly and said rudder beam assembly for adjusting angle of said wheel assembly relative to said rudder beam assembly, in a horizontal plane and within limits.

35. The invention according to claim 19 which includes a fluid operator operatively extending between said tail beam and said rudder beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

36. The invention according to claim 35 in which said rudder beam assembly includes a turnbuckle assembly between said ground engaging wheel assembly and said rudder beam assembly for adjusting angle of said wheel assembly relative to said rudder beam assembly, in a horizontal plane and within limits.

37. In an agricultural implement which includes a main frame, ground engaging tools on said main frame, means to raise and lower and adjust the depth and penetration of said ground engaging tools, a tail beam extending at an angle from one end of the main frame and a rudder beam assembly pivoted to the tail beam and including a ground engaging wheel assembly pivotally mounted on said rudder beam assembly, said implement normally being pulled by a tractor or the like at an angle to the direction of travel with the ground engaging wheel in trailing relationship to the implement and assisting in maintaining the said angle of travel, and a source of hydraulic fluid under pressure; the improvement comprising in combination a coulter assembly mounted on the inside of said tail beam, said coulter assembly including coulter means, means mounting said coulter assembly to said tail beam for pivotal action whereby said coulter means moves in a substantially vertical plane, and means operatively connecting said coulter assembly with said means to raise and lower said ground engaging tools whereby said coulter means is raised and lowered simultaneously with said ground engaging tools, means to adjust said coulter assembly independently of said ground engaging tools to set the maximum depth of penetration of said coulter means of said coulter assembly, said means to adjust said coulter assembly independently of said ground engaging tools includes a fluid operator acting as a rigid link up to a predetermined pressure, operatively connected by one end thereof to said means to raise and lower said ground engaging tools, and by the other end thereof to the upper end of said vertically situated control arm, and means to adjust the effective length of said fluid operator and hence the maximum depth of penetration of said coulter means.

38. The invention according to claim 37 in which said means to mount said coulter means support arm includes a guide secured to the lower end of said substantially vertically situated control arm, said coulter means support arm being mounted for sliding movement through said guide and means to clamp said guide to said arm in the desired position, and an outrigger support guide extending from said vertically situated control arm to said coulter means support arm and means to clamp said outrigger support guide to said last mentioned arm, in the desired position.

39. The invention according to claim 22 which includes a fluid operator operatively extending between said tail beam and said rudder beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

40. The invention according to claim 39 in which said rudder beam assembly includes a turnbuckle assembly between said ground engaging wheel assembly and said rudder beam assembly for adjusting angle of said wheel assembly relative to said rudder beam assembly, in a horizontal plane and within limits.

41. An agricultural implement comprising in combination a main frame, ground engaging wheels on said main frame and means to raise and lower and adjust the depth and penetration of said ground engaging tools, a tail beam extending at an angle from one end of the main frame and a rudder beam assembly pivoted to the tail beam and including a ground engaging wheel assembly pivotally mounted on said rudder beam assembly, said implement normally being pulled by a tractor or the like at an angle to the direction of travel with the ground engaging wheel in trailing relationship to the implement and assisting in maintaining the said angle of travel, a source of hydraulic fluid under pressure, a coulter assembly mounted on the inside of said tail beam, said coulter assembly including a coulter means, means mounting said coulter assembly to said tail beam for pivotal action whereby said coulter means moves in a substantially vertical plane and means operatively connecting said coulter assembly with said means to raise and lower said ground engaging tools whereby said coulter means is raised and lowered simultaneously with said ground engaging tools, including means to adjust said coulter assembly independently of said ground engaging tools to set the maximum depth of penetration of said coulter means of said coulter assembly, said means to mount said coulter means support arm includes a guide secured to the lower end of said substantially vertically situated control arm, said coulter means support arm being mounted for sliding movement through said guide and means to clamp said guide to said arm in the desired position, and an outrigger support guide extending from said vertically situated control arm to said coulter means support arm and means to clamp said outrigger support guide to said last mentioned arm, in the desired position.

42. The invention according to claim 41 in which said means to mount said coulter means support arm includes a guide secured to the lower end of said substantially vertically situated control arm, said coulter means support arm being mounted for sliding movement through said guide and means to clamp said guide to said arm in the desired position, and an outrigger support guide extending from said vertically situated control arm to said coulter means support arm and means to clamp said outrigger support guide to said last mentioned arm, in the desired position.

43. The invention according to claim 42 which includes a fluid operator operatively extending between said tail beam and said rudder beam assembly and being operatively connected to said source of fluid pressure, means to preset fluid pressure in said fluid operator, said means including a pressure reducing valve operatively connected between said source of fluid pressure and said fluid operator and a pressure relief valve operatively connected to said fluid operator and stop means between said tail beam and said rudder beam assembly, said fluid operator normally maintaining said rudder beam assembly against said stop means.

44. The invention according to claim 43 in which said rudder beam assembly includes a turnbuckle assembly between said ground engaging wheel assembly and said rudder beam assembly for adjusting angle of said wheel assembly relative to said rudder beam assembly, in a horizontal plane and within limits.

* * * * *